Oct. 25, 1955

F. J. BRAGA 2,721,937

RELAXATION OSCILLATOR

Filed Sept. 21, 1949

INVENTOR
F. J. BRAGA
BY
N. S. Ewing
ATTORNEY

United States Patent Office 2,721,937
Patented Oct. 25, 1955

2,721,937

RELAXATION OSCILLATOR

Felix J. Braga, Morristown, N. J., assignor to Bell Telephone Laboratories, Incorporated, New York, N. Y., a corporation of New York Application September 21, 1949, Serial No. 116,958

4 Claims. (Cl. 250—27)

This invention relates to oscillatory circuits and more particularly concerns an improvement in oscillatory circuits of the multivibrator type.

The multivibrator oscillator, as it is known in the prior art, comprises a pair of thermionic discharge devices which are arranged as a two-stage resistance-coupled amplifier in which the plate or anode of the second device is coupled to the control grid of the first device. Such an arrangement has two unstable current-conducting conditions and will support sustained oscillations because each stage contributes a 180-degree phase shift to an impulse traveling around the loop composed of these two devices.

If the discharge devices are biased such that one is normally conductive and the other is normally non-conductive, the resulting circuit has a stable and an unstable current-conducting condition. Circuits of this latter type are commonly called trigger circuits or flip-flop, one-shot or single-trip multivibrator circuits. As was previously stated, the distinguishing feature of these circuits is that one discharge device is biased to cut-off and consequently the circuit has one stable and one unstable condition of current conduction. The circuit rests in its stable current-conducting condition until disturbed by a voltage impulse of the proper polarity. When so disturbed, the circuit switches current-conduction to its normally non-conductive stage and this condition continues for a predetermined interval, the duration of which is largely controlled by the time constant of the interstage resistor-capacitor coupling circuit, after which time the circuit invariably reverts to its original condition. At the time of each conduction change, the potential at the anode of the previously conducting tube rises sharply, and ultimately rests at the same value as that of the anode potential source, and the potential at the anode of the previously cut-off tube is sharply lowered. Circuits of this type are useful for the generation of rectangularly shaped voltage impulses of precisely controlled duration and rate of recurrence. Although the decrease in anode potential in this type of circuit is substantially instantaneous, the increase in potential is not so rapid. This delay is caused by the current flow that is required to charge the circuit capacitances that are connected to the anode circuit, and results in a "rounding-off" of the wave form along the leading or front edge of the positive voltage impulse. For many uses of such circuits this rounding-off of the leading edge of the positive voltage impulse is an inconsequential variation from the square-wave form. However, in some certain applications, such as where the impulse is to be used for measuring the response of wide-band transmitting facilities, it is highly desirable that this voltage impulse assume as nearly as possible a rectangular outline. This desirability arises, of course, since the square-wave impulse contains a greater number of frequency components than does the more rounded-off or sinusoidal type of wave, and its use in a testing system is the equivalent of varying the frequency of the testing signal over a greater portion of the frequency spectrum.

It is accordingly an object of this invention to improve the operation of multivibrator oscillators and trigger circuits, by causing the produced voltage impulse at the anode of the discharge device to include wave components of higher frequency than is possible in the prior art circuit arrangements.

It is a second object of this invention to make possible the production of "square-wave" voltage impulses in which negligible rounding off occurs in the leading edge of the positive voltage impulse.

Still another object of this invention is to provide in a trigger circuit of the multivibrator type a means for charging the interstage coupling capacitance through a low impedance charging circuit.

The invention is featured in that a cathode-coupled amplifier circuit is utilized as the coupling agent or means between the discharge devices of an otherwise conventional multivibrator type of circuit or unit in such a manner that the usual rounding-off of the leading edge of the positive voltage impulse is eliminated and a substantially square-wave voltage impulse is generated in the anode circuit of the unit.

The invention will be better understood from the following description, when read with reference to the accompanying drawing, in which.

Figure 1:
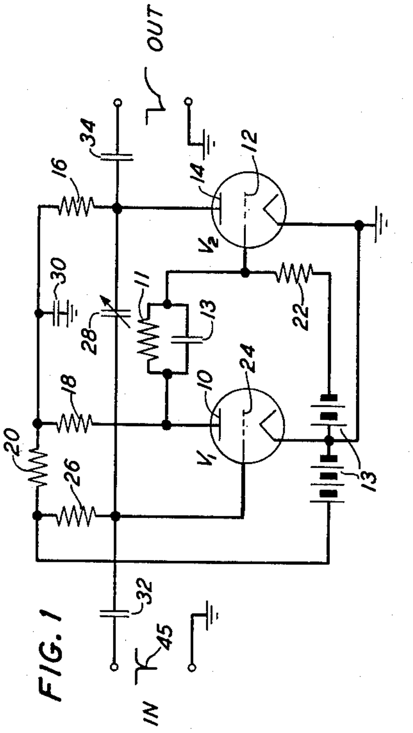
Fig. 1 shows a conventional pulse generating "flip-flop" oscillator or trigger circuit of the type previously known in the art.

Referring now to Fig. 1, electric discharge devices or vacuum tubes V1 and V2 together with the other circuit elements shown therein form a pulse generator circuit which is a modified version of the well-known Eccles-Jordan trigger circuit. The anode 10 of tube V1 is directly connected through a parallel resistor-capacitor combination 11, 13 to the control grid 12 of tube V2. Anodes 10 and 14 of tubes V1 and V2, respectively, are connected through anode load resistors 18, 16 and decoupling resistor 20 to a suitable source of anode potential for example battery 13. Control grid 12 of tube V2 is connected through grid resistor 22 to the negative terminal of battery 13. Ground is connected to battery 13 at a point intermediate its two terminals such that control grid 12 is normally held at a potential negative with respect to its cathode. Control grid 24 of tube V1 is connected to the battery 13 through grid resistor 26. Anode 14 of tube V2 is coupled to control grid 24 of tube V1 through coupling capacitor 28. Resistor 20 and capacitor 30 form a filter and decoupling circuit arrangement to prevent the alternating component of the anode fluctuations from appearing on control grid 24.

The circuit potentials of Fig. 1 are so chosen that tube V1 is normally conducting and tube V2 is normally nonconducting. These conditions are indicated by the portion of anode wave-form curves 48, 52 (Fig. 3) to the left of time $t_0$. When at time $t_0$ a negative voltage impulse 45 of sufficient magnitude is supplied through input coupling capacitor 32 to control grid 24, tube V1 is cut off and tube V2 is made conducting for a predetermined interval $t_0$—$t_1$. This interval is determined by the values of coupling capacitor 28, grid resistor 26, the potential of battery 13 and the characteristics of the vacuum tube V1. When conduction is forced in tube V2, the attendant voltage drop at its anode 14 is coupled through capacitor 28 to control grid 24 and renders V1 non-conductive in the manner characteristic of multivibrator circuits. Capacitor 28 immediately starts to discharge through grid resistor 26, and the potential $E_{g24}$ (curve 46, Fig. 3) of control grid 24 starts to rise toward its cut-off valve. When control grid 24 acquires a potential in excess of its cut-off value, conduction restarts in tube V1, with an attendant decrease in the potential $E_{p10}$ at its anode 10. This decreased potential, when divided by resistors 11, 22, is sufficient to restore tube V2 to its non-conductive state. Although conduction in tube V2 ceases at time $t_1$, the potential at its anode 14 does not immediately assume the value of the anode supply, since it is necessary to charge capacitor 28 through anode load resistor 16 to the potential of the anode supply. This condition is indicated in the portion $t_1$—$t_2$ of wave-form curve 52 (Fig. 3) which shows the exponential character of the potential increase at anode 14 when tube V2 is made non-conductive. The interval $t_1$—$t_2$ is determined by the magnitudes of capacitor 28 and resistor 16. After tube V2 has been made non-conductive and tube V1 has been restored to conduction at time $t_1$, the circuit of Fig. 1 remains quiescent until it is again disturbed by an input pulse 45 at some subsequent time $t_0$.

Figure 3:
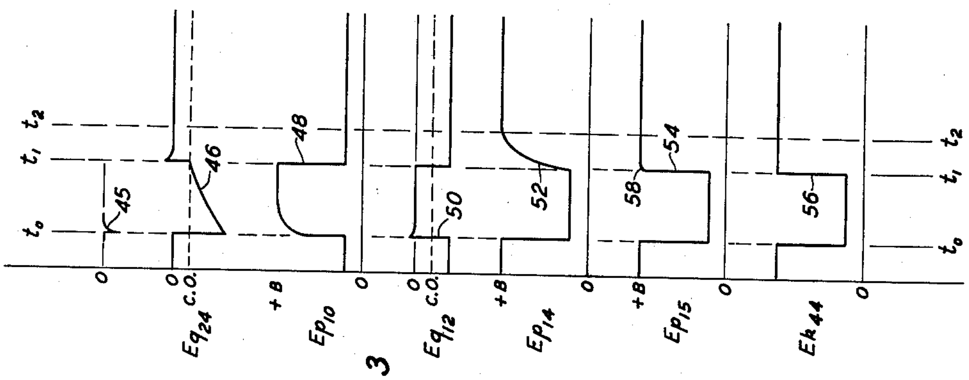
Fig. 3 shows a series of wave-form diagrams of the voltage impulses generated in the circuits of the units of Figs. 1 and 2.
Figure 2:
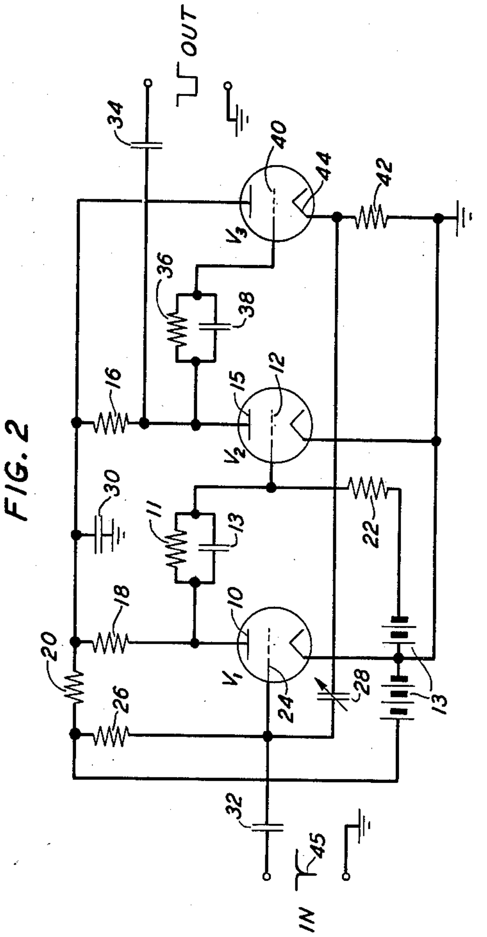
Fig. 2 is a voltage impulse generating unit constructed in accordance with the invention.

Referring now to Fig. 2, there is shown a pulse generator circuit in accordance with the invention in which the rise in potential at the anode 15 of tube V2 is greatly facilitated. Tubes V1 and V2 may be any suitable vacuum tube devices and may suitably be pentode tubes such as type 6AC7 connected as triode devices. As in the circuit of Fig. 1, tubes V1 and V2 are connected to a suitable source of anode potential or battery 13 through anode resistors 16, 18, and decoupling resistor 20. Control grid electrode 12 of tube V2 is connected to a voltage divider comprising resistors 11 and 22 shunted between the anode 10 of tube V1 and a source of negative potential, the magnitude of which is chosen such that tube V2 is normally in a non-conductive condition. This negative potential is secured at the negative terminal of battery 13 when a ground connection is suitably made to battery 13, as is indicated. Control grid 24 of tube V1 is connected to the source of anode supply through grid resistor 26 and is also coupled to a source (not shown) of negative voltage impulses 45 through coupling capacitor 32. Anode 15, which is the same as anode 14 of Fig. 1, but which is here renumbered to permit more ready identification of its potential variations as shown by curve 54 of Fig. 3, is coupled through the parallel combination of resistor 36 and capacitor 38 to control electrode 40 of vacuum tube device V3, which may be any suitable vacuum tube device, and may suitably be a pentode tube such as type 6AC7 connected as a triode. Resistor 42 is included in the cathode circuit of tube V3, and is connected at its cathode end through coupling capacitor 28 to control electrode 24 of tube V1. Tube V3 together with its cathode resistor 42 and capacitor 28 constitute a cathode-coupled amplifier and is occasionally identified as a cathode follower. Anode 15 of tube V2 is coupled through output capacitor 34 to output terminals labeled OUT, where the square-wave output may be suitably employed.

In one tested pulse generator, which was constructed in accordance with the invention, the following values were found to be appropriate when type 6AC7 tubes connected as triodes were employed:

| | | |
|---|---|---|
| Anode potential | volts | 300 |
| Anode load resistor **16**, **18** | ohms | 7,500 |
| Grid resistor **26** | do | 120,000 |
| Grid resistor **22** | do | 92,000 |
| Cathode load resistor **42** | do | 39,000 |
| Resistors **11** and **36** | do | 120,000 |
| Capacitors **13** and **38** | mmf | 50 |
| Coupling capacitor **28** | mmf | 100 |
| Negative voltage grid supply | volts | —150 |

The operation of the circuit of Fig. 2 will now be explained with reference to the wave-form diagrams of Fig. 3. Assume that at a time just prior to time $t_0$ tube V1 is conducting and tube V2 is non-conducting. Under these circumstances the potential $E_{p10}$ at anode 10 will be low, and $E_{p15}$ at anode 15 will be equal to the potential of the anode potential source 13. At time $t_0$, negative voltage impulse 45 is received through coupling capacitor 32 and momentarily reduces the potential on control grid 24. This voltage impulse is repeated in the anode circuits of tubes V1 and V2 in such manner that the potential of control grid 40 of cathode follower V3 is sharply reduced. This action results in sharply lowering the potential of cathode 44 and causes a negative voltage impulse to be delivered through coupling capacitor 28 to control grid 24, to further decrease the potential of that electrode. Through the well-known regenerative action common to multivibrator circuits, this negative voltage impulse is amplified such that the potential $E_{g24}$ on control grid 24 is reduced to a value considerably lower than its cut-off value, and the potential $E_{p10}$ of anode 10 rises to substantially the potential of battery 13. These relationships are shown by curves 46, 48 (Fig. 3), respectively. The rise in potential of anode 10 carries the potential $E_{g12}$ of control grid 12 with it, as is indicated by curve 50 (Fig. 3), and results in sharply lowering the potential $E_{p15}$ at anode 15 as is indicated by curve 54. The drop in potential at anode 15 is coupled through resistor 36 to control grid 40 and results in sharply lowering the potential of cathode 44 by the usual cathode-follower action. Capacitor 28 discharges around a circuit comprising cathode resistor 42, battery 13 and grid resistor 26 such that it reaches the cut-off potential of tube V1 at time $t_1$. At this time, conduction is started in tube V1, the potential $E_{p10}$ at anode 10 is sharply reduced as indicated by curve 48, the potential $E_{g12}$ of control grid 12 is sharply reduced, as indicated by curve 50, with a resulting rise in potential $E_{p15}$ at anode 15, as indicated by curve 54. It should be noted that the rise in potential $E_{p15}$ at anode 15 is substantially instantaneous, and that it quickly assumes the same potential as that of battery 13. There may possibly be observed a slight rounding of the potential curve 54 at point 58, which rounding is due to the charging of the small stray and interelectrode capacitances of the circuit that remain effectively coupled to anode 15. However, the combined magnitudes of these capacitances are small relative to that of interelectrode coupling capacitor 28, which is connected to anode 14 in the prior art trigger circuit of Fig. 1, and which in this described embodiment is connected to the cathode 44 of tube 40. The increased rate-of-change in potential $E_{p15}$ at the leading edge of its positive excursion is effected because coupling capacitor 28 is divorced from anode 15. This capacitor is now charged through the relatively low impedance path comprising the cathode-anode circuit of cathode follower V3 while its control grid 40 is highly positive, instead of through the anode load resistor 16, as is the case in the prior art circuit (Fig. 1).

It should also be noted that the charging interval $t_1$—$t_2$ of the described prior art device (Fig. 1) is about one-half of the cut-off interval $t_0$—$t_1$; and since this former interval is determined to a large degree by the magnitude of coupling capacitor 28, it is evident that it will be lengthened if the cut-off period $t_0$—$t_1$ is increased by increasing the value of capacitor 28. Contrariwise, the residual rounding at point 58 of wave-form 54, caused by the charging of only the small stray and interelectrode capacitances of tube V2 in the improved pulse generator of Fig. 2, is about one-tenth of the duration of the cut-off interval $t_0$—$t_1$. Since the stray and interelectrode capacitances are not changed by variations in the size of coupling capacitor 28, it follows that changes in the duration of cut-off interval $t_0$—$t_1$ do not cause corresponding changes in the time required to charge these capacitances; and therefore the shape of wave-form 54 at point 58 is not changed when the pulse period is varied. Stated otherwise, the band width of the pulse remains substantially constant as the pulse repetition rate is changed. This independence of the pulse repetition rate is desirable where it is intended to use the pulse generator as the source of diversely-timed impulses for a variety of wide-band testing conditions.

In the preceding description, the utility of this invention has been principally described in terms of the "squaring" of the rectangular wave form, or otherwise stated, as increasing the band width of the generated signal. It will also be appreciated that the increased rate of change of voltage makes possible the production of square-wave impulses of shorter duration and greater repetition rate than has heretofore been possible.

Although the invention has been described as being incorporated in a pulse generator circuit of a specific type and employing enumerated circuit components, it should be evident that its utility is not limited to this specified arrangement. Variations and modifications of the described arrangement in which the coupling capacitor is charged through the low impedance path of a cathode-coupled amplifier and which do not depart from the spirit and scope of this invention will suggest themselves to those skilled in the art.

What is claimed is:

1. A pulse generator circuit comprising a first, a second and a third electron discharge device, each including an anode, a cathode and a control grid electrode, a first source of potential having a positive terminal and a negative terminal, load resistors connected to the anodes of said first and second devices, said load resistors and the anode of said third device being connected to the positive terminal of said potential source, a grid resistor connected between said positive terminal and the control grid electrode of said first device, a cathode load resistor connected to the cathode of said third device, said cathode resistor and the cathode electrodes of said first and second devices being connected to the negative terminal of said potential source, a resistive connection between the anode of said first device and the control grid electrode of said second device, a second source of potential having a negative potential terminal resistively connected to the control electrode of said second device and having a positive potential terminal connected to the negative terminal of said first potential source, a resistive connection between the anode of said second discharge device and the control grid electrode of said third device, input and output terminals capacitively connected to the control grid electrode of said first device and the anode electrode of said second device, respectively, and a timing capacitor coupled between the cathode electrode of said third device and the control grid electrode of said first device, the cathode-anode circuit of said third device forming a low impedance charging path for said timing capacitor during the charging intervals thereof.

2. A pulse generator circuit comprising a first, a second and a third electron discharge device, each comprising a cathode, a control grid and an anode electrode, an anode source of potential and a grid-biasing source of potential, the negative terminal of said anode source and the positive terminal of said grid-biasing source being directly interconnected and also being directly connected to the cathodes of said first and said second devices and being resistively connected to the cathode of said third device, an input terminal, the control grid of said first device being capacitively connected to said terminal and resistively connected to the positive terminal of said anode source, a resistive voltage-dividing circuit connected between the anode of said first device and the negative terminal of said grid-biasing source, the control electrode of said second device being connected at an intermediate point on said voltage divider, an output terminal, a capacitive connection between said output terminal and the anode of said second device, said last-mentioned anode being resistively connected to the control grid of said third device, and a timing capacitor coupled between the control grid electrode of said first device and the cathode electrode of said third device, the cathode-anode circuit of said third device forming a low impedance charging path for said timing capacitor during the charging intervals thereof.

3. A pulse producing circuit comprising a normally conductive and a normally non-conductive electron discharge device, each comprising a cathode, an anode and a control grid electrode, a source of potential having a positive, a negative and an intermediate terminal, a resistive connection between the anode of each of said devices and said positive terminal, a resistive connection between said positive terminal and the control grid of said normally conductive device, an input terminal connected to said control grid, a direct conductive connection between the cathodes of said devices and the intermediate terminal of said source of potential, a voltage-dividing circuit shunted between the anode of said normally conductive device and the negative terminal of said potential source, a direct connection between an intermediate point on said voltage-dividing circuit and the control grid of said normally non-conductive device, a cathode coupled amplifier having its control grid connected to the anode of said normally non-conductive device, its anode connected to the positive terminal of said source, a cathode load resistor connected to said intermediate terminal of said source, and its cathode coupled through a timing capacitor to the control grid of said normally conductive device, the cathode-anode circuit of said cathode coupled amplifier forming a low impedance charging path for said timing capacitor during the charging intervals thereof, and an output terminal connected to the anode of said normally non-conducting device.

4. A voltage impulse generator comprising first and second electric discharge devices each including an anode, a cathode, and a control electrode, a source of potential having positive and negative terminals, a pair of load impedances connected between the positive terminal and the respective anodes, said cathodes being connected to said negative terminal, a cross-coupling between the anode of said first device and the control electrode of said second device, an individual grid return resistor connected in the cathode-control electrode circuit of each of said discharge devices, a third electric discharge device including a cathode, an anode, and a control electrode, a coupling between the anode of said second discharge device and the control electrode of said third discharge device, a connection between the anode of said third device and said positive terminal, a resistive connection between the cathode of said third device and said negative terminal, and a capacitor coupled between the cathode of said third device and the control electrode of said first device, said capacitor forming, with the grid return resistor connected in the cathode-control electrode circuit of said first device, the principal timing circuit for the generated impulses, and the cathode-anode circuit of said third device forming a low impedance charging path for said capacitor during the charging intervals thereof.

References Cited in the file of this patent

UNITED STATES PATENTS

| | | |
|---|---|---|
| 2,155,210 | Young | Apr. 18, 1939 |
| 2,418,826 | Engstrom | Jan. 22, 1943 |
| 2,436,808 | Jacobsen et al. | Mar. 2, 1948 |
| 2,506,439 | Bergfors | May 2, 1950 |

FOREIGN PATENTS

| | | |
|---|---|---|
| 587,940 | Great Britain | May 9, 1947 |
| 599,256 | Great Britain | Mar. 9, 1948 |